US011138751B2

(12) United States Patent
Guizilini et al.

(10) Patent No.: US 11,138,751 B2
(45) Date of Patent: Oct. 5, 2021

(54) SYSTEMS AND METHODS FOR SEMI-SUPERVISED TRAINING USING REPROJECTED DISTANCE LOSS

(71) Applicant: Toyota Research Institute, Inc., Los Altos, CA (US)

(72) Inventors: Vitor Guizilini, Santa Clara, CA (US); Sudeep Pillai, Santa Clara, CA (US); Rares A. Ambrus, San Francisco, CA (US); Jie Li, Mountain View, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 89 days.

(21) Appl. No.: 16/689,501

(22) Filed: Nov. 20, 2019

(65) Prior Publication Data

US 2021/0004976 A1   Jan. 7, 2021

Related U.S. Application Data

(60) Provisional application No. 62/871,108, filed on Jul. 6, 2019.

(51) Int. Cl.
*G06T 7/55* (2017.01)
*G06T 7/521* (2017.01)
(Continued)

(52) U.S. Cl.
CPC ............ *G06T 7/55* (2017.01); *G06K 9/00201* (2013.01); *G06K 9/6249* (2013.01);
(Continued)

(58) Field of Classification Search
CPC .. G06T 7/55; G06T 7/521; G06T 7/70; G06T 2207/10016; G06T 2207/10028;
(Continued)

(56) References Cited

U.S. PATENT DOCUMENTS 10,298,910 B1   5/2019  Kroeger
10,580,158 B1 *  3/2020  Mousavian ........ G06K 9/00201
(Continued)

FOREIGN PATENT DOCUMENTS

WO        2018063460 A1    4/2018

OTHER PUBLICATIONS

Kuznietsov, Y., Stückler, J., Leibe, B. "Semi-Supervised Deep Learning for Monocular Depth Map Prediction," 2017, pp. 1-14, arXiv: 1702.02706v3. (Year: 2017).*

(Continued)

*Primary Examiner* — Nancy Bitar
*Assistant Examiner* — Daniella M. DiGuglielmo
(74) *Attorney, Agent, or Firm* — Christopher G. Darrow; Darrow Mustafa PC

(57) ABSTRACT

System, methods, and other embodiments described herein relate to training a depth model for monocular depth estimation. In one embodiment, a method includes generating, as part of training the depth model according to a supervised training stage, a depth map from a first image of a pair of training images using the depth model. The pair of training images are separate frames depicting a scene from a monocular video. The method includes generating a transformation from the first image and a second image of the pair using a pose model. The method includes computing a supervised loss based, at least in part, on reprojecting the depth map and training depth data onto an image space of the second image according to at least the transformation. The method includes updating the depth model and the pose model according to at least the supervised loss.

20 Claims, 9 Drawing Sheets

(51) Int. Cl.

| | |
|---|---|
| *G06T 7/70* | (2017.01) |
| *G06T 7/20* | (2017.01) |
| *G06N 20/00* | (2019.01) |
| *G06K 9/62* | (2006.01) |
| *G06N 5/04* | (2006.01) |
| *G06K 9/00* | (2006.01) |
| *G01S 7/48* | (2006.01) |

(52) U.S. Cl.
CPC ......... *G06K 9/6257* (2013.01); *G06K 9/6264* (2013.01); *G06N 5/04* (2013.01); *G06N 20/00* (2019.01); *G06T 7/20* (2013.01); *G06T 7/521* (2017.01); *G06T 7/70* (2017.01); *G01S 7/4808* (2013.01); *G06T 2207/10016* (2013.01); *G06T 2207/10028* (2013.01); *G06T 2207/20081* (2013.01); *G06T 2207/30244* (2013.01); *G06T 2207/30252* (2013.01)

(58) Field of Classification Search
CPC ............. G06T 2207/20081; G06T 7/20; G06T 2207/30244; G06T 2207/30252; G01S 7/4808; G06K 9/00201; G06K 9/00805; G06K 9/6249; G06K 9/6257; G06K 9/6264; G06N 20/00; G06N 5/04
USPC ......................................................... 382/106
See application file for complete search history.

(56) References Cited

U.S. PATENT DOCUMENTS

| | | | |
|---|---|---|---|
| 10,916,035 B1* | 2/2021 | Kroeger | G06K 9/6215 |
| 2018/0189565 A1* | 7/2018 | Lukierski | A47L 9/009 |
| 2019/0155302 A1 | 5/2019 | Lukierski et al. | |
| 2019/0197368 A1 | 6/2019 | Madani et al. | |
| 2020/0005489 A1* | 1/2020 | Kroeger | G06K 9/4604 |

OTHER PUBLICATIONS

Uhrig, J., Mayer, N., Ilg, E., Dosovitskiy, A., Brox, T. "DeMoN: Depth and Motion Network for Learning Monocular Stereo", 2017, pp. 1-20, arXiv:1612.02401v2 (Year: 2017).*
Godard, C., Aodha, O.M., Firman, M., Brotstow, G. "Digging into Self-Supervised Monocular Depth Estimation", 2019, pp. 1-18, arXiv:1806.01260v3 (Year: 2019).*
Laga, H. A Survey on Deep Learning Architectures for Image-based Depth Reconstruction. arXiv:1906.06113, 2019. (Year: 2019).*
Lee, M. and Fowlkes. C. C. CeMNet: Self-Supervised Learning for Accurate Continuous Ego-Motion Estimation. 2019 IEEE/CVF Conference on Computer Vision and Pattern Recognition Workshops (CVPRW), 2019, pp. 354-363, doi: 10.1109/CVPRW.2019.00048. (Year: 2019).*
Amiri et al. titled Semi-Supervised Monocular Depth Estimation with Left-Right Consistency Using Deep Neural Networks, found at: arXiv:1905.07542v1 [cs.CV] May 18, 2019 , in 6 pages.
Kuznietsov et al. titled "Semi-Supervised Deep Learning for Monocular Depth Map Prediction," found at: arXiv:1702.02706v3 [cs.CV] May 9, 2017 , in 14 pages.
Wang et al., "Image Quality Assessment: From Error Visibility to Structural Similarity," IEEE Transactions on Image Processing, vol. 13, No. 4, Apr. 2004 , in 14 pages.
Yang et al., "Deep Virtual Stereo Odometry: Leveraging Deep Depth Prediction for Monocular Direct Sparse Odometry," found at: arXiv:1807.02570v2 [cs.CV] Jul. 25, 2018, in 17 pages.
Luo et al. "Single View Stereo Matching," found at: arXiv:1803.02612v2 [cs.CV] Mar. 9, 2018 , in 9 pages.
Guo "Learning Monocular Depth by Distilling Cross-domain stereo networks," found at: arXiv:1808.06586v1 [cs.CV] Aug. 20, 2018 , in 22 pages.

Guizilini et al. "PackNet-SfM 3D Packing for Self-Supervised Monocular Depth Estimation," found at: arXiv:1905.02693v1 [cs.CV] May 6, 2019 , in 14 pages.
Zhou et al. "Unsupervised Learning of Depth and Ego-Motion from Video," found at: arXiv:1704.07813v2 [cs.CV] Aug. 1, 2017 , in 10 pages.
Fu et al. "Deep Ordinal Regression Network for Monocular Depth Estimation," found at: arXiv:1806.02446v1 [cs.CV] Jun. 6, 2018 , in 10 pages.
Pillai, et al., "Superdepth: Selfsupervised, super-resolved monocular depth estimation", Found at: arXiv:1810.01849, 2018.
Garg et al., "Unsupervised cnn for single view depth estimation: Geometry to the rescue", found at: arXiv:1603.04992v2 [cs.CV] Jul. 29, 2016.
Mahjourian et al., "Unsupervised learning of depth and ego-motion from monocular video using 3d geometric constraints", In Proceedings of the IEEE Conference on Computer Vision and Pattern Recognition, pp. 5667-5675, 2018.
Godard et al., "Unsupervised monocular depth estimation with left-right consistency", found at: arXiv:1609.03677v3 [cs.CV] Apr. 12, 2017.
Zhou et al., "Stereo magnification: Learning view synthesis using multiplane images", found at: arXiv:1805.09817v1 [cs.CV] May 24, 2018.
Eigen et al., "Depth map prediction from a single image using a multi-scale deep network", found at: arXiv:1406.2283v1 [cs.CV] Jun. 9, 2014.
Li et al., "Depth and surface normal estimation from monocular images using regression on deep features and hierarchical CRFs", In International Conference on Computer Vision and Pattern Recognition (CVPR), pp. 1119-1127, 2015.
Qi et al., "Geometric neural network for joint depth and surface normal estimation", In International Conference on Computer Vision and Pattern Recognition (CVPR), pp. 283-291, 2018.
Lee at al., "Single-image depth estimation based on fourier domain analysis", In International Conference on Computer Vision and Pattern Recognition (CVPR), pp. 330-339, 2018.
Jaderberg et al., "Spatial transformer networks", In Advances in neural information processing systems, pp. 2017-2025, 2015.
Ummenhofer et al., "DeMoN: Depth and Motion Network for Learning Monocular Stereo", found at: arXiv:1612.02401v2 [cs.CV] Apr. 11, 2017.
Yin et al., "GeoNet: Unsupervised learning of dense depth, optical flow and camera pose", In Proceedings of the IEEE Conference on Computer Vision and Pattern Recognition (CVPR), vol. 2, 2018.
Zou et al., "DF-net: Unsupervised joint learning of depth and flow using cross-task consistency", In European Conference on Computer Vision, 2018.
Klodt et al., "Supervising the new with the old: Learning SFM from SFM", In European Conference on Computer Vision, pp. 713-728. Springer, 2018.
Wang et al., "Learning depth from monocular videos using direct methods", In Proceedings of the IEEE Conference on Computer Vision and Pattern Recognition, pp. 2022-2030, 2018.
Flynn et al., "Deepstereo: Learning to predict new views from the world's imagery", In Proceedings of the IEEE Conference on Computer Vision and Pattern Recognition, pp. 5515-5524, 2016.
Godard, "Digging Into Self-Supervised Depth Estimation", found at: arXiv:1806.01260v1 [cs.CV] Jun. 4, 2018.
Godard, "Digging Into Self-Supervised Depth Estimation", version 3, found at: arXiv:1806.01260v3 [cs.CV] May 3, 2019.
Geiger et al., "Vision meets robotics: The kitti dataset", The International Journal of Robotics Research, 32(11):1231-1237, 2013.
Deng et al., "ImageNet: A Large-Scale Hierarchical Image Database",In Proceedings of the IEEE Conference on Computer Vision andPattern Recognition, 2009.
Kingma et al., "Adam: A method for stochastic optimization" found at: arXiv:1412.6980v1 [cs.LG] Dec. 22, 2014.
Paszke et al., "Automatic differentiation in pytorch", In NIPS-W, 2017, found at: https://openreview.net/forum?id=BJJsrmfCZ.
Uhrig et al., "Sparsity Invariant CNNs", found at: arXiv:1708.06500v2 [cs.CV] Aug. 30, 2017.

(56) References Cited

OTHER PUBLICATIONS

Mayer et al., "A large dataset to train convolutional networks for disparity, optical flow, and scene flow estimation", In Proceedings of the IEEE Conference on Computer Vision and Pattern Recognition, pp. 4040-4048, 2016.
Casser at al., "Depth prediction without the sensors: Leveraging structure for unsupervised learning from monocular videos", found at: arXiv:1811.06152v1 [cs.CV] Nov. 15, 2018.
Laina et al., "Deeper depth prediction with fully convolutional residual networks", found at arXiv:1606.00373v2 [cs.CV] Sep. 19, 2016.

* cited by examiner

SYSTEMS AND METHODS FOR SEMI-SUPERVISED TRAINING USING REPROJECTED DISTANCE LOSS

CROSS-REFERENCE TO RELATED APPLICATIONS

This application claims benefit of U.S. Provisional Application No. 62/871,108, filed on, Jul. 6, 2019, which is herein incorporated by reference in its entirety.

TECHNICAL FIELD

The subject matter described herein relates, in general, to systems and methods for training machine learning algorithms to determine depths of a scene from a monocular image, and, more particularly, to training a depth model using a reprojected loss function that uniquely characterizes errors in depth estimates without relying on appearance-based losses such as a photometric loss.

BACKGROUND

Various devices that operate autonomously or that provide information about an environment use sensors that facilitate perceiving various aspects. For example, a robotic device may use information from the sensors to develop an awareness of obstacles in order to navigate through the environment. In particular, the robotic device uses the perceived information to determine a 3-D structure of the environment in order to identify navigable regions and avoid potential hazards. The ability to perceive distances using sensor data provides the robotic device with the ability to plan movements through the environment and generally improve situational awareness about the environment. However, depending on the available onboard sensors, the robotic device may acquire a limited perspective of the environment, and, thus, may encounter difficulties in distinguishing aspects of the environment.

That is, various sensors perceive different aspects of the environment differently and also have different implementation characteristics. For example, LiDAR is effective at perceiving depth in the surrounding environment but suffers from difficulties such as high costs and can encounter errors in certain weather conditions. Moreover, other sensors, such as stereo cameras, function to effectively capture depth information but also suffer from difficulties with cost, limited field-of-view, and so on. While monocular cameras can be a cost-effective approach, the sensor data from such cameras does not explicitly include depth information. Instead, the device implements processing routines that derive depth information from the monocular images.

However, leveraging monocular images to perceive depth can also suffer from difficulties such as limited resolution, image artifacts, difficulties with training the processing routines (e.g., expensive or limited availability of training data), and so on. As such, many difficulties associated with determining depth data persist that may result in reduced situational awareness for a device, and, thus, difficulties in navigating or performing other associated functions.

SUMMARY

In one embodiment, example systems and methods relate to an improved approach to training a depth model using a reprojected distance loss. For example, a depth system is disclosed that employs a custom training architecture in combination with a reprojected distance loss function to train the depth model and a pose model together. In one approach, the training architecture implements a semi-supervised training process that includes two separate stages, a first stage that is self-supervised and a second stage that is supervised. By including the second stage that further leverages the noted loss function, which is not appearance-based, the depth system improves the performance of the depth model and causes the depth model to learn metrically accurate depths. Consequently, the training architecture may still employ a self-supervised stage with images from monocular video but improves the self-supervised process with an additional refinement stage that adapts the models to overcome issues with scale ambiguity. Alternatively, the training architecture may use a supervised approach in isolation that applies the reprojected distance loss function as a primary mechanism for training the depth model. In any case, the depth system trains the depth model using an approach that realizes improvements due to the way in which the reprojected distance loss characterizes errors in the depth estimates from the depth model without relying on appearance-based losses (e.g., photometric losses).

In one embodiment, a depth system for training a depth model for monocular depth estimation is disclosed. The depth system includes one or more processors and a memory communicably coupled to the one or more processors. The memory stores a network module including instructions that when executed by the one or more processors cause the one or more processors to generate, as part of training the depth model according to a supervised training stage, a depth map from a first image of a pair of training images using the depth model. The pair of training images are separate frames depicting a scene from a monocular video, and wherein at least the first image includes corresponding depth data. The network module including instructions to generate a transformation from the first image and a second image of the pair using a pose model. The transformation defining a relationship between the pair of training images. The memory storing a training module including instructions that when executed by the one or more processors cause the one or more processors to compute a supervised loss based, at least in part, on reprojecting the depth map and the depth data onto an image space of the second image according to at least the transformation. The training module including instructions to update the depth model and the pose model according to at least the supervised loss.

In one embodiment, a non-transitory computer-readable medium for training a depth model for monocular depth estimation and including instructions that when executed by one or more processors cause the one or more processors to perform various functions is disclosed. The instructions include instructions to generate a depth map from a first image of a pair of training images using the depth model. The pair of training images are separate frames depicting a scene from a monocular video. At least the first image includes corresponding depth data. The instructions include instructions to generate a transformation from the first image and a second image of the pair using a pose model. The transformation defining a relationship between the pair of training images. The instructions include instructions to compute a supervised loss based, at least in part, on reprojecting the depth map and the depth data onto an image space of the second image according to at least the transformation. The instructions include instructions to update the depth model and the pose model according to at least the supervised loss.

In one embodiment, a method for training a depth model for monocular depth estimation is disclosed. In one embodiment, the method includes generating, as part of training the depth model according to a supervised training stage, a depth map from a first image of a pair of training images using the depth model. The pair of training images are separate frames depicting a scene from a monocular video. The first image includes corresponding depth data. The method includes generating a transformation from the first image and a second image of the pair using a pose model. The transformation defining a relationship between the pair of training images. The method includes computing a supervised loss based, at least in part, on reprojecting the depth map and the depth data onto an image space of the second image according to at least the transformation. The method includes updating the depth model and the pose model according to at least the supervised loss.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
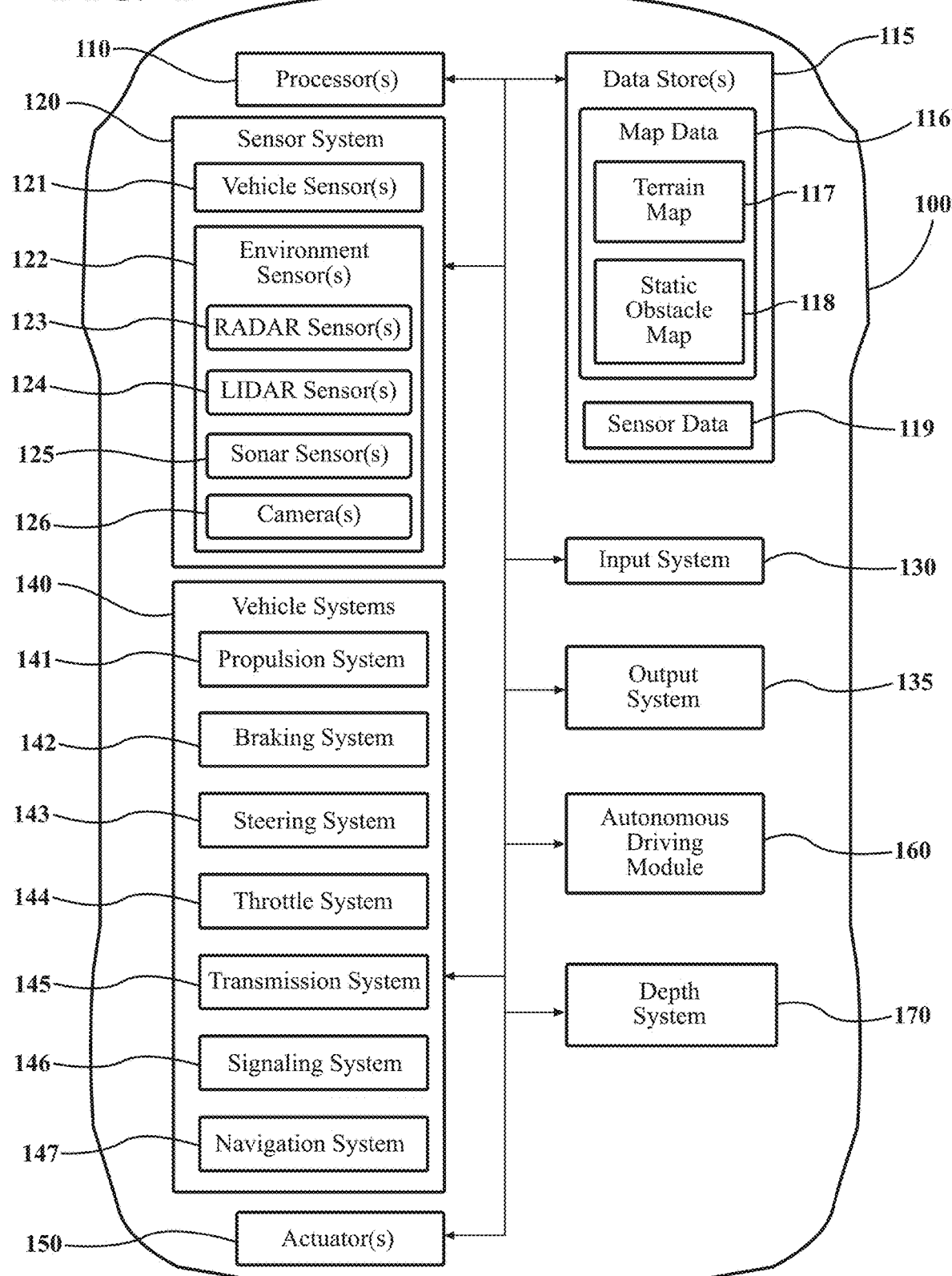
FIG. 1 illustrates one embodiment of a vehicle within which systems and methods disclosed herein may be implemented.

Systems, methods, and other embodiments associated with an improved approach to training a depth model using a reprojected distance loss are disclosed herein. As previously noted, perceiving aspects of the environment can represent different challenges depending on which sensors a device employs to support the endeavor. In particular, difficulties with using monocular cameras to perceive depths in the surrounding environment can complicate the use of such sensors. That is, because a system trains and implements additional routines to derive the depth data from monocular images, difficulties can arise in relation to aberrations in the derived depth data from characteristics of the processing approach (e.g., scale ambiguity). The difficulties can cause the depth estimates to be unreliable for resolving aspects of the environment, thereby resulting in an incomplete situational awareness of the environment.

Therefore, in one embodiment, a depth system is disclosed that employs a training architecture to support training the depth model using a reprojected distance loss. The depth system generates the reprojected distance loss, in one embodiment, using ground truth data (e.g., depth data) that corresponds to an input of the depth model. The depth system uses the depth data as a point of comparison in the reprojected distance loss function with data points of a depth map from the depth model. Thus, in one example, the depth system calculates the reprojected distance loss by projecting data points from the depth map and the depth data onto an image space defined by a contextual view of a camera that captured monocular images used as input in the training process. In particular, the depth system projects the data onto a view of a second image in a training image pair in order to produce predicted and ground truth pixels on the image space that the depth system then compares to generate the reprojected distance loss. Because the values derive from depth information and not appearance data (i.e., not pixels of an image), the reprojected distance loss is independent of visual aberrations or other visual complexities and may also be applied to update a pose model, as subsequently described.

In one approach, the depth system implements the reprojected distance loss as at least one loss term within a training framework that implements semi-supervised training. In general, the approach to semi-supervised training of the depth model may include two separate stages that involve both self-supervised learning and supervised learning, which may be implemented as an added stage of training to refine the depth model using sparse depth data on which the reprojected distance loss function operates. Whereas various approaches to supervised training of a depth model may use comprehensive depth maps (e.g., nearly per-pixel annotations) that correlate with images, the depth system implements the training architecture to use images from monocular video in the self-supervised stage, thereby avoiding a need for specialized sensors that provide comprehensive ground truth data for this stage. Additionally, the depth system applies, in one approach, sparse depth data in the second stage thereby using depth labels from less expensive LiDAR or other depth sensors. Thus, in one aspect, the depth system improves the training process by using standard monocular cameras to capture monocular video, and supplementing the self-supervised training with the second stage that refines the depth model using sparse depth data along with the reprojected distance loss to weakly supervise the second stage.

Accordingly, because annotated training data can be expensive to produce due to the use of expensive sensors (e.g., 64 beam LiDAR devices), and/or manual labeling processes, and because monocular video alone under a self-supervised process may result in scale ambiguities in the understanding of the trained depth model, the present systems and methods overcome the noted difficulties by using the reprojected distance loss to uniquely characterize errors in depth estimates while using sparse depth data as a basis for the reprojected distance loss to supervise the training. Consequently, the training architecture utilizes the efficient approach of the self-supervised training using monocular video, but improves the self-supervised process with the additional refinement stage that uses less complex and, thus, more easily acquired depth data along with the unique manner of characterizing the losses in the reprojected distance loss to improve the training process. In this way, the reprojected distance loss function improves the ability of the depth model to infer metrically accurate depths without using extensively annotated training data.

Moreover, as an additional aspect of the training architecture that facilitates training on monocular video, the training architecture implements a pose model in addition to the depth model to support training the depth model under a self-supervised approach. The pose model, in at least one example, provides for estimating ego-motion (i.e., camera motion) between different frames of the monocular video that is parameterized as, for example, a 6-DoF transformation. The transformation, in combination with depth data from the depth model, permits the depth system to synthesize a target monocular image (i.e., the original monocular image input to the depth model as training data) from which the depth system derives training values in the form of self-supervised losses. The depth system can then use the losses to adapt hyper-parameters of the depth and pose models to perform the training.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic/robotic device or other form of powered transport that, for example, perceives an environment according to monocular images, and thus benefits from the functionality discussed herein. In yet further embodiments, the vehicle 100 may instead be a statically mounted device, an embedded device, or another device that uses monocular images to derive depth information about a scene or that separately trains the depth model for deployment in such a device.

In any case, the vehicle 100 (or another electronic device) also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-9 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to train and implement a model to process monocular images and provide depth estimates for an environment (e.g., objects, surfaces, etc.) depicted therein. Moreover, while depicted as a standalone component, in one or more embodiments, the depth system 170 is integrated with the autonomous driving module 160, the camera 126, or another component of the vehicle 100. The noted functions and methods will become more apparent with a further discussion of the figures.

Figure 2:
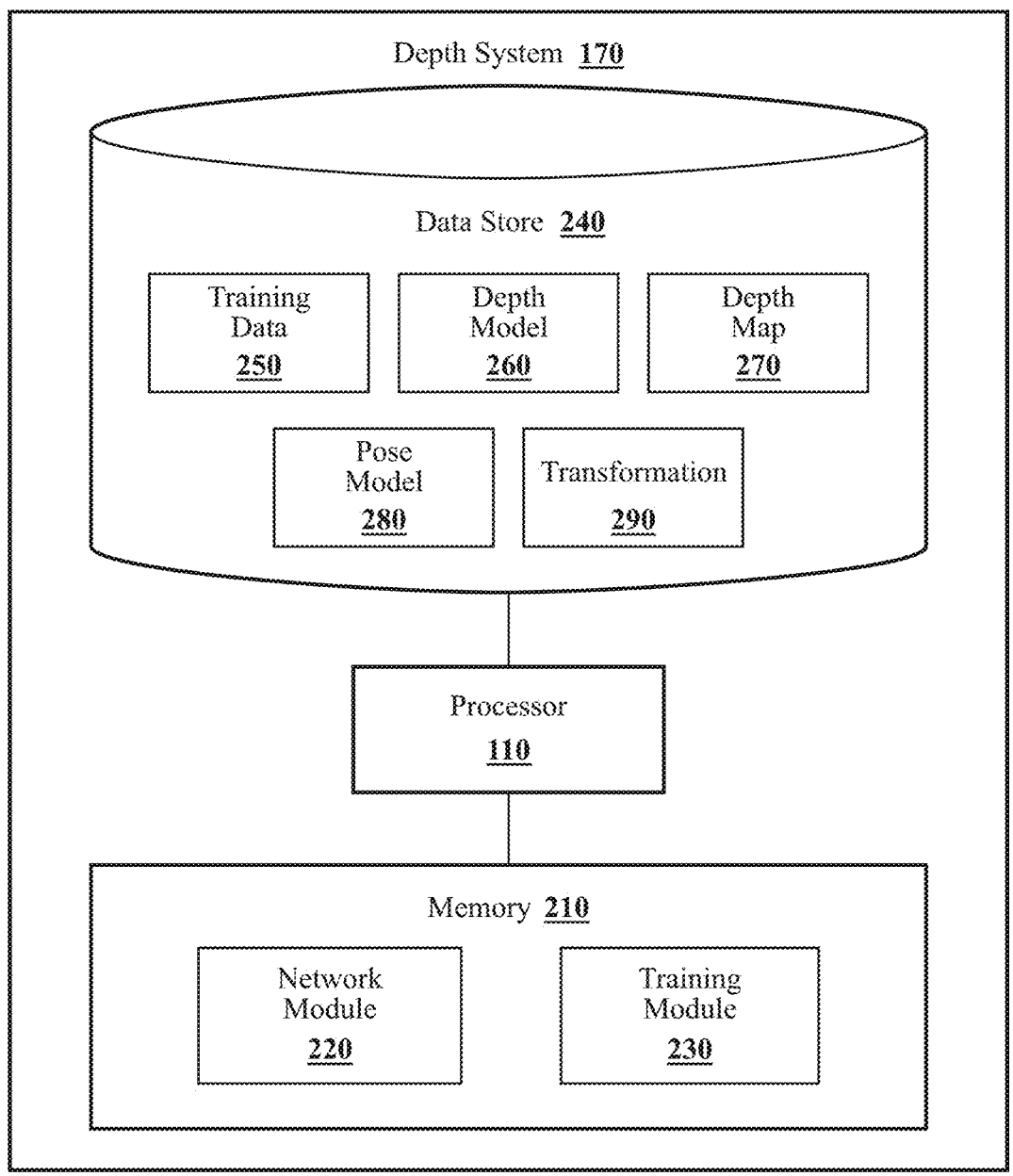
FIG. 2 illustrates one embodiment of a depth system that is associated with training a depth model.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a network module 220 and a training module 230. In general, the processor 110 is an electronic processor such as a microprocessor that is capable of performing various functions as described herein. In one embodiment, the depth system 170 includes a memory 210 that stores the network module 220 and the training module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein.

Furthermore, in one embodiment, the depth system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes training data 250, a depth model 260, a depth map(s) 270, a pose model 280, and a transformation(s) 290 along with, for example, other information that is used by the modules 220 and 230.

The training data 250 generally includes one or more monocular videos that are comprised of a plurality of frames in the form of monocular images. As described herein, a monocular image is, for example, an image from the camera 126 or another similar camera that is part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the characteristics of the camera 126. In further aspects, the camera 126 is an array of two or more cameras that capture multiple images of the surrounding environment and stitch the images together to form a comprehensive 360-degree view of the surrounding environment.

In any case, the monocular image itself includes visual data of the FOV that is encoded according to a video standard (e.g., codec) associated with the camera 126. In general, characteristics of the camera 126 and the video standard define a format of the monocular image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the image is a monocular image in that the image is a single view of the scene with no explicit additional modality indicating depth. In contrast to a stereo image that may integrate left and right images from separate cameras mounted side-by-side to provide an additional depth channel, the monocular image does not include explicit depth information such as disparity maps derived from comparing the stereo images pixel-by-pixel. Instead, the monocular image implicitly provides depth information in the relationships of perspective and size of elements depicted therein from which the depth model 260 derives the depth map 270.

Moreover, the monocular video may include observations of many different scenes. That is, as the camera 126 or another original source camera of the video progresses through an environment, perspectives of objects and features in the environment change, and the depicted objects/features themselves also change, thereby depicting separate scenes (i.e., particular combinations of objects/features). Thus, the depth system 170 may extract particular training pairs of monocular images from the monocular video for training. In particular, the depth system 170 generates the pairs from the video so that the pairs of images are of the same scene. As should be appreciated, the video includes a series of monocular images that are taken in succession according to a configuration of the camera. Thus, the camera may generate the images (also referred to herein as frames) of the video at regular intervals, such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the pairs from successive ones (i.e., adjacent) of the images, but instead can generally pair separate images of the same scene that are not successive as training images. Thus, in one approach, the depth system 170 pairs every other image depending on the fps. In a further approach, the depth system pairs every fifth image as a training pair. The greater the timing difference in the video between the pairs, the more pronounced a difference in camera position. However, the change in position may also result in fewer shared features/objects between the images. As such, as previously noted, the pairs of training images are of a same scene and are generally constrained, in one or more embodiments, to be within a defined number of frames (e.g., 5 or fewer) to ensure correspondence of an observed scene between the monocular training images. In any case, the pairs of training images are monocular images from a monocular video that are separated by some interval of time (e.g., 0.06 s) such that a perspective of the camera changes between the pair of training images as a result of motion of the camera through the environment while generating the video.

Additionally, the training data 250, in one or more embodiments, further includes depth data. The depth data indicates distances from a camera that generated the monocular images to features in the surrounding environment. The depth data is, in one embodiment, sparse or generally incomplete for a corresponding scene such that only sparsely distributed points within a scene are annotated by the depth data as opposed to a depth map that generally provides comprehensive depths for each separate depicted pixel.

Figure 3A:
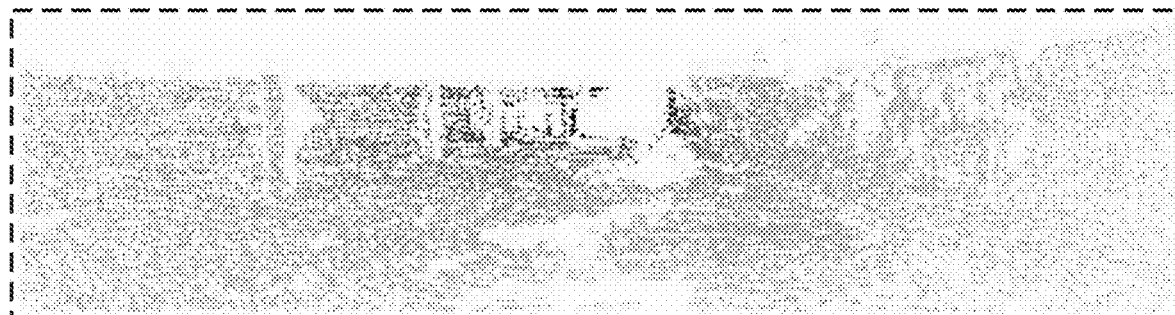
FIGS. 3A-C illustrate different examples of depth data for a scene.
Figure 3B:
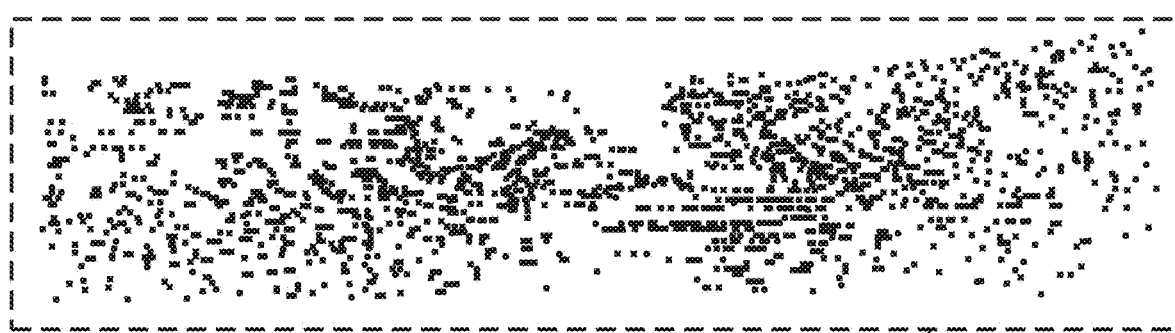
Figure 3C:
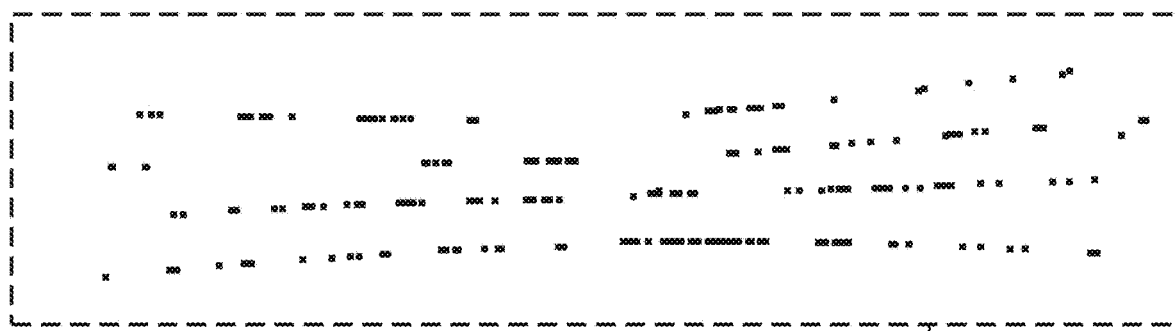

Consider FIGS. 3A, 3B, and 3C, which depict separate examples of depth data for a common scene. FIG. 3A depicts a depth map 300 that includes a plurality of annotated points generally corresponding to an associated monocular image on a per pixel basis. Thus, the depth map 300 includes about 18,288 separate annotated points. By comparison, FIG. 3B is an exemplary 3D point cloud 310 that may be generated by a LiDAR device having 64 scanning beams. Thus, the point cloud 310 includes about 1,427 separate points covering a same area as the map 300. Even though the point cloud 310 includes substantially fewer points than the depth map 300, the depth data of FIG. 3B represents a significant cost to acquire over a monocular video on an image-by-image basis. These costs and other difficulties generally relate to an expense of a robust LiDAR sensor that includes 64 or more separate beams, difficulties in calibrating this type of LiDAR device with the monocular camera, storing large quantities of data associated with the point cloud 310 for each separate image, and so on.

As an example of sparse depth data, FIG. 3C depicts a point cloud 320. In the example of point cloud 320, a LiDAR having 4 beams generates about 77 points that form the point cloud 320. Thus, in comparison to the point cloud 310, the point cloud 320 includes about 5% of the depth data as the point cloud 310, which is a substantial reduction in data. However, the sparse information provides for sufficient supervision to facilitate overcoming scale ambiguities within the depth model when used as an additional refinement process for training in combination with the noted self-supervision process.

As an additional comparison of the FIGS. 3A-3C, note that within FIGS. 3A and 3B, the depth data is sufficiently dense to convey details of existing features/objects such as vehicles, etc. However, within the point cloud 320 of FIG. 3C, the depth data is sparse or, stated otherwise, the depth data vaguely characterizes the corresponding scene according to distributed points across the scene that do not generally provide detail of specific features/objects depicted therein. Thus, this sparse depth data that is sporadically dispersed in a thin/scant manner across the scene may not provide enough data for some purposes such as object classification but does provide sufficient information to supervise a refinement stage of training the depth model 260.

While the depth data is generally described as originating from a LiDAR, in further embodiments, the depth data may originate from a set of stereo cameras, radar, or another depth-related sensor that is calibrated with the monocular camera 126 generating the monocular video.

Furthermore, the depth data itself generally includes depth/distance information relative to a point of origin such as the camera 126, and may also include coordinates (e.g., x, y within an image) corresponding with separate depth measurements.

With further reference to FIG. 2, the depth system 170 further includes the depth model 260, which produces the depth map 270, and the pose model 280, which produces the transformation 290. Both of the models 260 and 280 are, in one embodiment, machine learning algorithms. However, the particular form of either model is generally distinct. That is, for example, the depth model 260 is a machine learning algorithm that accepts an electronic input in the form of a single monocular image and produces the depth map 270 as a result of processing the monocular image. The exact form of the depth model 260 may vary according to the implementation but is generally a convolutional type of neural network.

Figure 4:
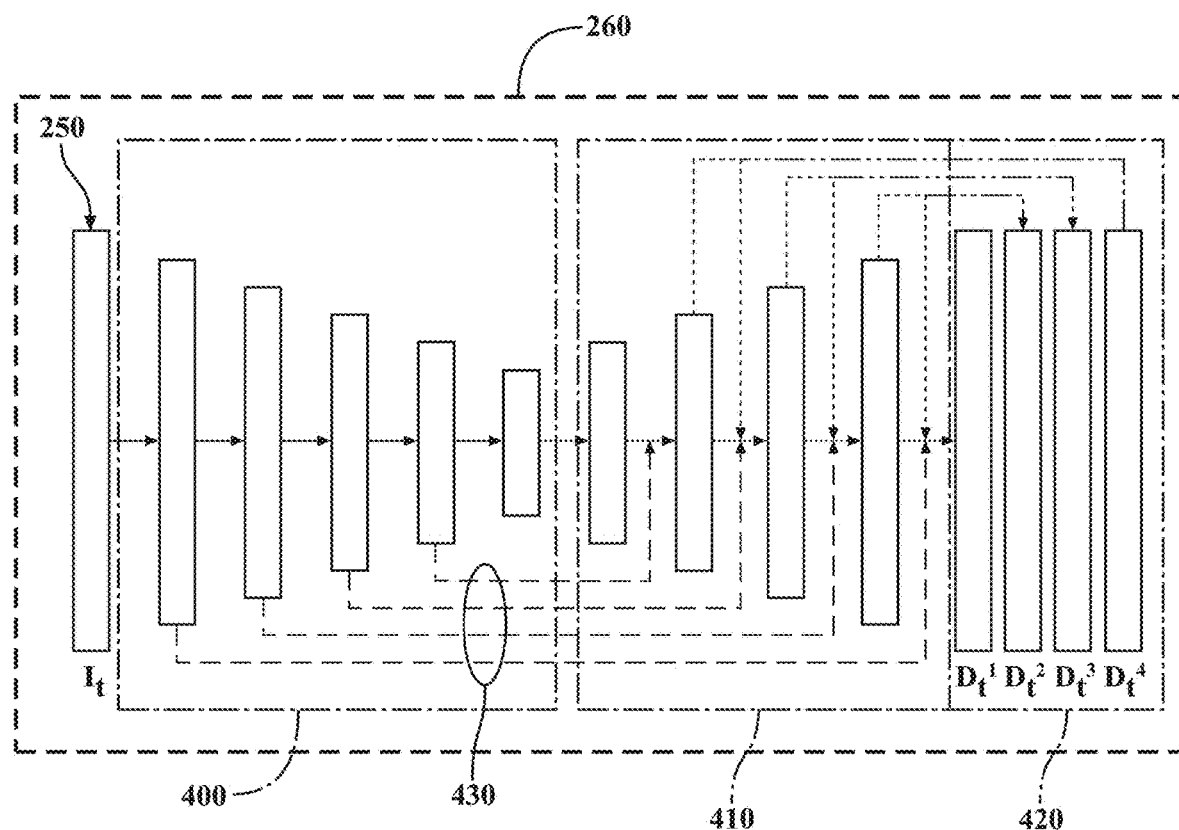
FIG. 4 illustrates a diagram for one configuration of a depth model.
Figure 5:
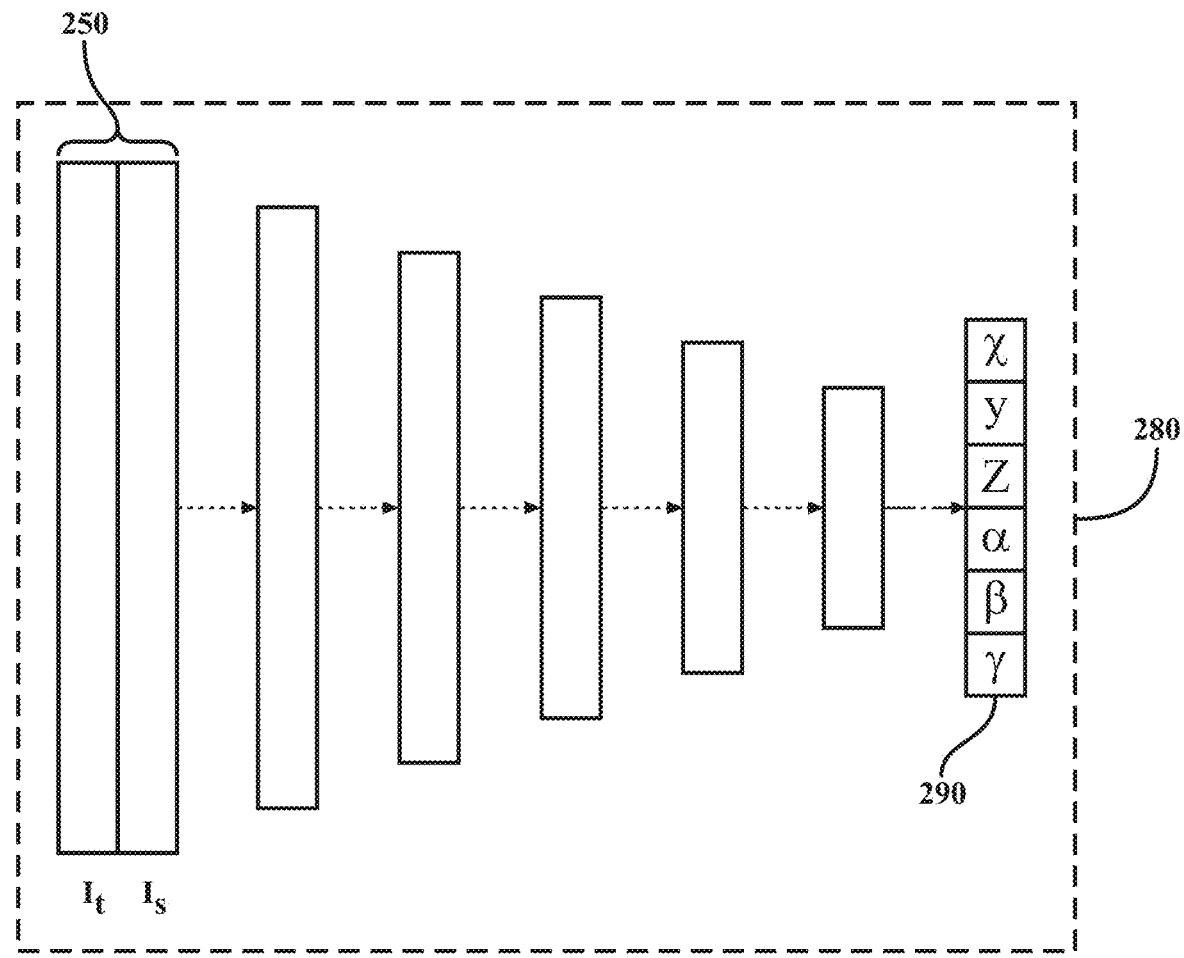
FIG. 5 illustrates a diagram for one configuration of a pose model.

As an additional explanation of one embodiment of the depth model 260 and the pose model 280, consider FIG. 4 and FIG. 5. FIG. 4 illustrates a detailed view of the depth model 260 and the pose model 280. In one embodiment, the depth model 260 has an encoder/decoder architecture. The encoder/decoder architecture generally includes a set of neural network layers including convolutional components 400 (e.g., 2D and/or 3D convolutional layers forming an encoder) that flow into deconvolutional components 410 (e.g., 2D and/or 3D deconvolutional layers forming a decoder). In one approach, the encoder accepts the image 250, which is a monocular image from the training data 250, as an electronic input, and processes the image to extract features therefrom. The features are, in general, aspects of the image that are indicative of spatial information that the image intrinsically encodes. As such, encoding layers that form the encoder function to, for example, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder 400 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the depth model 260. As such, the encoder includes a variety of separate layers that operate on the monocular image, and subsequently on derived/intermediate feature maps that convert the visual information of the monocular image into embedded state information in the form of encoded features of different channels.

In one embodiment, the decoder 410 unfolds (i.e., adapt dimensions of the tensor to extract the features) the previously encoded spatial information in order to derive the depth map 270 according to learned correlations associated with the encoded features. That is, the decoding layers generally function to up-sample, through sub-pixel convolutions and other mechanisms, the previously encoded features into the depth map 270, which may be provided at different resolutions 420. In one embodiment, the decoding layers comprise unpacking blocks, two-dimensional convolutional layers, and inverse depth layers that function as output layers for different scales of the feature map 270. The depth map 270 is, in one embodiment, a data structure corresponding to the input image that indicates distances/depths to objects/features represented therein. Additionally, in one embodiment, the depth map 270 is a tensor with separate data values indicating depths for corresponding locations in the image on a per-pixel basis.

Moreover, the depth model 260 can further include skip connections 430 for providing residual information between the encoder and the decoder to facilitate memory of higher-level features between the separate components. While a particular encoder/decoder architecture is discussed, as previously noted, the depth model 260, in various approaches, may take different forms and generally functions to process the monocular images and provide depth maps that are per-pixel estimates about distances of objects/features depicted in the images.

Continuing to FIG. 5, the pose model 280 accepts two monocular images (i.e., a training pair) from the training data 250 of the same scene as an electronic input and processes the monocular images ($I_t$, $I_s$) to produce estimates of camera ego-motion in the form of a set of 6 degree-of-freedom (DOF) transformations between the two images. The pose model 280 itself is, for example, a convolutional neural network (CNN) or another learning model that is differentiable and performs a dimensional reduction of the input images to produce the transformation 290. In one approach, the pose model 280 includes 7 stride-2 convolutions, a 1×1 convolution with 6*(N−1) output channels corresponding to 3 Euler angles, and a 3-D translation for one of the images (source image $I_s$), and global average pooling to aggregate predictions at all spatial locations. The transformation 290 is, in one embodiment, a 6 DOF rigid-body transformation belonging to the Special Euclidean group SE(3) that represents the change in pose between the pair of images provided as inputs to the model 280. In any case, the pose model 280 performs a dimensional reduction of the monocular images to derive the transformation 290 therefrom.

As an additional note, while the depth model 260 and the pose model 280 are shown as discrete units separate from the network module 220, the depth model 260 and the pose model 280 are, in one or more embodiments, generally integrated with the network module 220. That is, the network module 220 functions to execute various processes of the models 260/280 and use various data structures of the models 260/280 in support of such execution. Accordingly, in one embodiment, the network module 220 includes instructions that function to control the processor 110 to generate the depth map 270 using the depth model 260 and generate the transformation 290 using the pose model 280 as disclosed.

Figure 6:
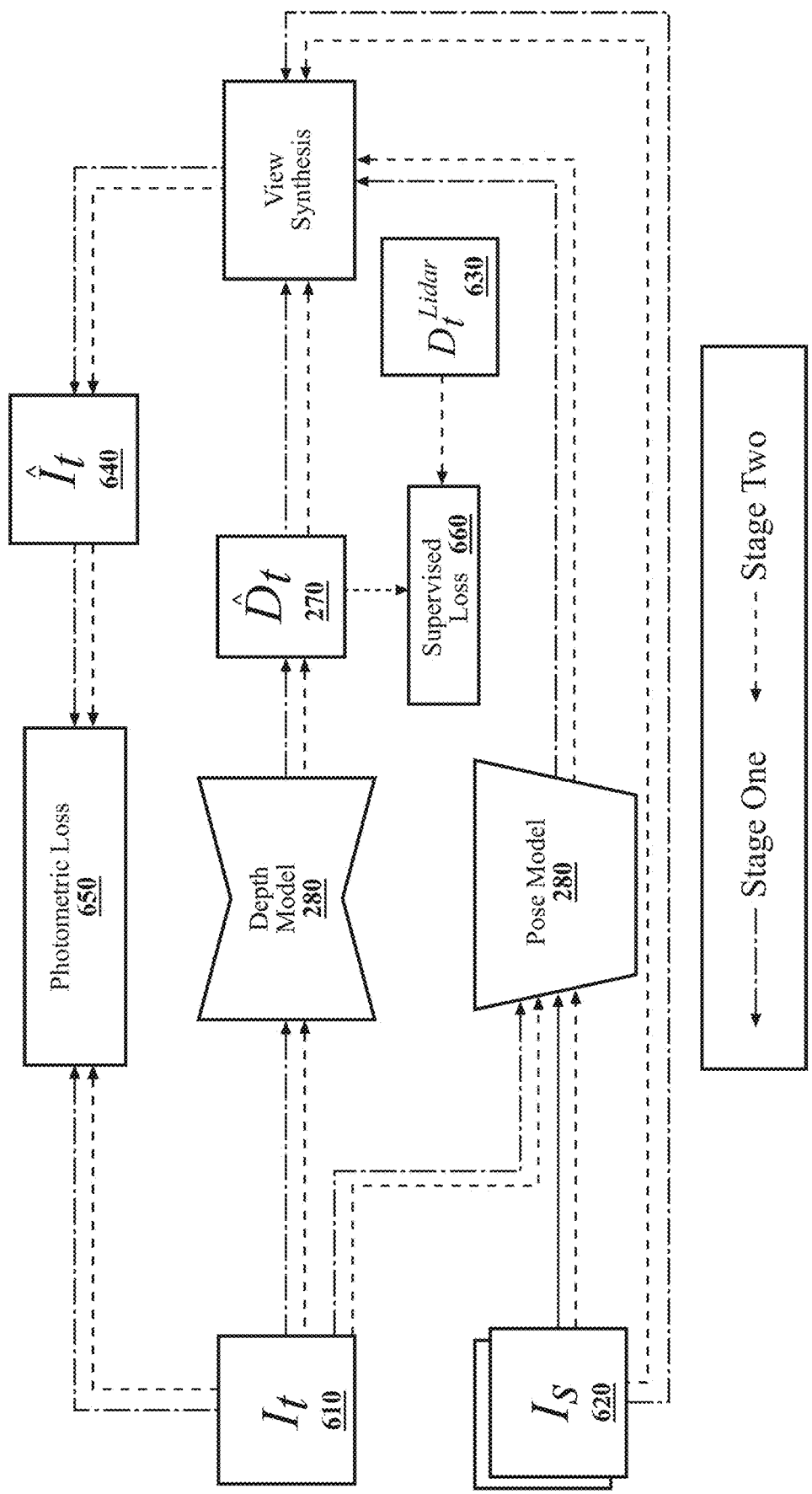
FIG. 6 illustrates one embodiment of a training architecture that includes a depth model and a pose model for semi-supervised monocular depth estimation.

As a further explanation of one embodiment of the training architecture formed in relation to the depth model 260 and the pose model 280, consider FIG. 6 in relation to components previously described in relation to FIG. 2. FIG. 6 illustrates one embodiment of a training architecture 600 that denotes various relationships between the depth model 260, the pose model 280, and inputs/outputs thereof. As shown in FIG. 6, the training data 250 includes a first image ($I_t$) 610 and a second image ($I_s$) 620 of a training pair, and also includes depth data 630 illustrated in the form of sparse LiDAR data. As an additional note about training using the illustrated architecture 600, the training module 230 generally includes instructions that function to control the processor 110 to execute various actions associated with training the depth model 260 and the pose model 280. For example, the training module 230, in one embodiment, controls the training according to a two-stage process, as shown. Of course, in alternative arrangements, the illustrated architecture may include a single stage (e.g., supervised second stage) without a distinct first stage. In such an arrangement, the supervised loss 660 is, for example, combined with the photometric loss 650 to train the depth model 260.

Returning to the two-stage approach, the first stage includes a self-supervised training process that involves synthesizing an additional image using the transformation 290 and the depth map 270 produced from the models 260/280 operating on the images 610/620 in order to generate a self-supervised loss in the form photometric loss 650.

The second stage includes the same self-supervised training as the first stage supplemented with the depth data 630 to produce a supervised loss 660 (e.g., reprojected distance loss) in addition to the photometric loss 650. Thus, in the first stage and the second stage, the training module 230 causes the network module 220 to execute the depth model 260 and the pose model 280 on the training data 250, but also supplements the second stage with the additional supervised loss term 660, which the training module 230 may use to train both the depth model 260 and the pose model 280.

In any case, the network module 220 generally includes instructions that function to control the processor 110 to execute various actions associated with the depth model 260 and the pose model 280. For example, in one embodiment, the network module 220 functions to process the first image 610 of a pair of training images from the training data 250 according to the depth model 260 thereby producing the depth map 270 for training. The network module 220, in further embodiments, also uses the depth model 260 to generate the depth map 270 for additional purposes, once trained, such as resolving aspects of an environment for hazard avoidance, path planning, and so on.

In any case, the network module 220 also functions to execute the pose 280 to produce the transformation 290 (not illustrated). The depth system 170 uses the transformation as a basis for synthesizing the image 640 from which the training module 230 generates the photometric loss 650 as will be explained further subsequently. Moreover, the network module 220, in one approach, executes the models 260/280 in parallel for purposes of training, and at the direction of the training module 230. Thus, in addition to executing the model 260, the network module 220, in one embodiment, processes the first image 610 and the second image 620 from the pair of training images to generate the transformation 290 using the pose model 280. Thus, the network module 220 generally operates to execute the models 260 and 280 over the training data 250, while the training module 230 functions to perform the explicit training processes such as generating the loss values and updating the models 260/280.

In any case, once the network module 220 executes the models 260/280 over the images 610/620 to produce the depth map 270 and the transformation 290, the training module 230 generates the synthesized image 640. In one embodiment, the synthesized image 640 is, for example, a synthesized version of the second image 620 according to the depth map 270 and the transformation 290. That is, the process of self-supervised training of the depth model 260 in the structure from motion (SfM) context involves synthesizing a different image from the depth map 270 at a different camera pose as translated according to the transformation 290. The training module 230 generates the synthesized image 640 using an image reconstruction function that may include a machine learning algorithm such as a generative neural network (e.g., encoder/decoder architecture, a generative adversarial network (GAN), an autoencoder, etc.), a convolutional neural network (CNN), or another suitable architecture that accepts the depth map 270 and the transformation 290 as input and produces the synthesized image 640 as output.

From this synthesized image 640, the training module 230 can generate the loss 650 and a pose loss (not illustrated). Thus, the training module 230 formulates the generation of the depth map 270 as a photometric error minimization across the images 310/320 (e.g., $I_{t-1}$ and $I_{t+1}$). The training module 230 can then compare the synthesized image 640 and the original image 310 to determine the monocular loss 340 (i.e., appearance-based), which is embodied as, for example, the photometric loss. This loss characterizes an accuracy of the depth model 260 in producing the depth map 270. Thus, the training module 230 can then use the calculated loss to adjust the depth model 260. Additionally, the training module 230 uses the monocular loss 340 in combination with a velocity supervision loss that is derived from the instantaneous velocity to generate the pose loss 350.

As further explanation, consider that the self-supervised loss context for structure from motion (SfM) in which the training module 230 is generally configured with a goal of (i) a monocular depth model $f_D: I \rightarrow D$ (e.g., depth model 260) that predicts the scale-ambiguous depth $\hat{D} = f_D(I(p))$ for every pixel p in the target image $I_t$; and (ii) a monocular ego-motion estimator $f_x: (I_t, I_S)$ (e.g., pose model 280), that predicts the set of 6-DoF rigid-body transformations for all $s \in S$ given by $$x_{t \rightarrow s} = \begin{pmatrix} R & t \\ 0 & 1 \end{pmatrix} \in SE, \quad (3)$$

between the target image $I_t$ and the set of source images $I_s \in I_S$ considered as part of the temporal context. As a point of implementation, in one or more embodiments, the training module 230 uses frames $I_{t-1}$ and $I_{t+1}$ as source images, although a larger context is possible, as previously noted. Additionally, the training module 230 uses the depth data from the training data 250 as an input to, in one aspect, the reprojected distance loss function to (i) collapse the scale ambiguity inherent to a single camera configuration into a metrically accurate version of the depth model 260, and (ii) improve the depth model 260 and the pose model 280 by leveraging cues from the depth data that are not appearance-based.

The training module 230 implements the training objective for the depth model 260 according to two components. The two components include a self-supervised term (e.g., photometric loss 650) that operates on appearance matching $\mathcal{L}_p$ between the target image $I_t$ and the synthesized image $I_{s \rightarrow t}$ (also annotated as $\hat{I}_t$) from the context set $S = \{I_s\}_{s=1}^{S}$, with masking $M_p$ and depth smoothness $\mathcal{L}_{smooth}$, and a supervised loss value (e.g., reprojected distance loss) that operates on a comparison between the predicted depth map 270 and the depth data (e.g., sparse LiDAR data) from the training data 250.

$$\mathcal{L}(I_t, \hat{I}_t) = \mathcal{L}_p \odot \mathcal{M}_p + \lambda_1 \mathcal{L}_{smooth} + \lambda_2 \mathcal{L}_{supervised} \quad (1)$$

$M_p$ is a binary mask that avoids computing the photometric loss on the pixels that do not have a valid mapping (e.g., pixels from the separate images that do not project onto the target image given the estimated depth), $\lambda_1$, $\lambda_2$ represent weights for adjusting the loss terms in eq (1), which is the stage two loss that combines the photometric loss, the depth smoothness loss, and the supervised loss. $\mathcal{L}_p$ represents appearance matching loss (e.g., photometric loss) and is implemented according to, in one embodiment, a pixel-level similarity between the target image $I_t$ and the synthesized image $\hat{I}_t$ using a structural similarity (SSIM) term combined with an L1 pixel-wise loss term inducing an overall photometric loss as shown in equation (2).

$$\mathcal{L}_p(I_t, \hat{I}_t) = \alpha \frac{1 - SSIM(I_t, \hat{I}_t)}{2} + (1-\alpha)\|I_t - \hat{I}_t\| \quad (2)$$

While multi-view projective geometry provides strong cues for self-supervision, errors due to parallax and out-of-bounds objects can have an undesirable effect incurred on the photometric loss that can include added noise to the training. Accordingly, the training module 230, in one approach, can mitigate these effects by calculating the minimum photometric loss per pixel for the source image according to EQ (3).

$$\mathcal{L}_p(I_t, S) = \min_{s \in S} \mathcal{L}_p(I_t, I_{s \to t}) \quad (3)$$

The intuition involves the same pixel not occluding or being out-of-bounds in all context images, and that the association with minimal photometric loss should be the correct. Additionally, as shown below, the training module 230 masks out static pixels by removing pixels that have a warped photometric loss higher than a corresponding unwarped photometric loss, which the training module 230 calculates using the original source image (e.g., 620) without synthesizing the target. The mask ($M_p$) removes pixels that have appearance loss that does not change between frames, which includes static scenes and dynamic objects moving at a similar speed as the camera.

$$M_p = \min_{s \in S} \mathcal{L}_p(I_t, I_s) > \min_{s \in S} \mathcal{L}_p(I_t, I_{s \to t}) \quad (4)$$

$\mathcal{L}_S$ represents depth smoothness loss and is implemented to regularize the depth in textureless low-image gradient regions, as shown in equation (5). The smoothness loss is an edge-aware term that is weighted for separate pyramid levels starting from one and decaying by a factor of two for the separate scales.

$$\mathcal{L}_s(\hat{D}_t) = |\delta_x \hat{D}_t| e^{-|\delta_x I_t|} + |\delta_y \hat{D}_t| e^{-|\delta_y I_t|} \quad (5)$$

Thus, the training module 230, in one approach, calculates the appearance-based loss (also referred to as a self-supervised loss) according to the above to include the photometric loss, the mask, and the depth smoothness terms for the self-supervised first stage of the semi-supervised training. Through this first training stage, the model 260 develops a learned prior of the monocular images as embodied by the internal parameters of the model 260 from the training on the image pairs in the training data 250. In general, the model 260 develops the learned understanding about how depth relates to various aspects of an image according to, for example, size, perspective, and so on. However, training according to the self-supervised approach alone can result in the depth model 260 still lacking awareness of a metrically accurate scale.

Consequently, the training module 230 controls the network module 220 to execute the second stage that is a supervised training process in combination with the self-supervised process as previously described. Thus, the training module 230 further employs the second stage loss (e.g., supervised loss 660) in addition to the first stage loss to refine the depth model 260. As shown in equations (6), (7), and (9) below, the second stage loss may take different forms depending on a particular implementation. Thus, the second stage loss may be an L1 loss, as shown in equation (6), a Berhu loss as shown in equation (7), or the reprojected distance loss, as shown in equation (9). The L1 loss and the Berhu loss generally illustrate approaches to directly comparing the ground truth data (i.e., the depth data) with the information produced by the depth model 260, which does not account for the pose model 280, whereas the reprojected distance loss does account for the pose model 280 by using aspects of the transformation to project the depth information (e.g., depth map 270 and depth data) back on an image space.

$$\mathcal{L}_1(\hat{D}_t, D_t) = \frac{1}{V} \sum_{i \in V_t} \|d_t - \hat{d}_t\| \quad (6)$$

$$B(x) = \begin{cases} |x| & |x| \le c \\ \dfrac{x^2 + c^2}{2c} & |x| > c \end{cases} \quad (7)$$

$$c = \frac{1}{5} \max_i (|\tilde{y}_i - y_i|) \quad (8)$$

$$\mathcal{L}_{rep}(\hat{D}_t, D_t) = \frac{1}{V} \sum_{i \in V_t} \|\hat{p}_s^i - p_s^i\| = \quad (9)$$

$$\frac{1}{V} \sum_{i \in V_t} \|\pi_s(\hat{x}_t^i) - \pi_s(x_t^i)\| = \frac{1}{V} \sum_{i \in V_t} \|\pi_s(\hat{d}_t^i K^{-1} u_t^i) - \pi_s(d_t^i K^{-1} u_t^i)\|$$

In regards to the reprojected distance loss function/equation (9), for each pixel $p_t$ in the target image $I_t$, the reprojected depth error from which the overall reprojected distance loss is derived corresponds to the distance between the true (i.e., ground truth pixels derived from depth data) and predicted (i.e., predicted pixels derived from depth map 270) associations of the pixel in the source image as denoted in EQ (9). For EQ (9), $u_t^i = (u, v, 1)_S^{i,T}$ denotes the homogeneous coordinates of pixel i in the target image $I_t$, and $\hat{x}_t^i$, $x_t^i$ are the homogeneous coordinates of the pixel's reconstructed 3D points given the predicted $\hat{d}_t^i$ and ground truth $d_t^i$ depth values. $\hat{p}_S^i = (\hat{u}, \hat{v})_S^{i,T}$, and $p_S^i = (u, v)_S^{i,T}$ denote the 2D projected pixel coordinates of points $\hat{x}_t^i$, $x_t^i$ onto source frame $I_s$ (i.e., image space of the second image $I_s$), produced by the project function $\pi_t = \pi(x; K, T_{t \to s})$.

Figure 8:
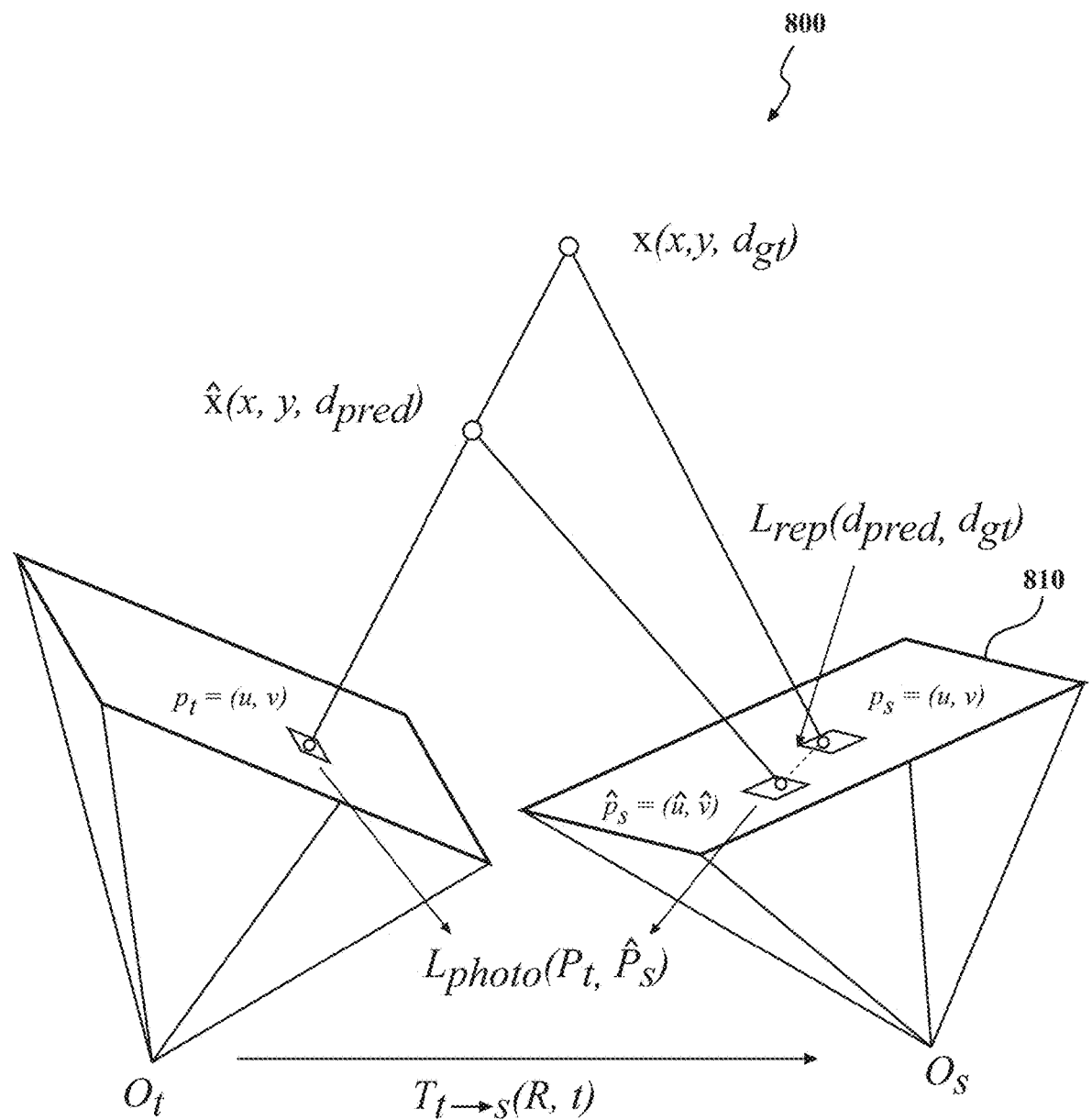
FIG. 8 is a diagram illustrating one example of the reprojected distance loss.

FIG. 8 illustrates a diagram 800 that shows the general operation of the reprojected distance loss function as implemented by the training module 230. As shown, $O_t$ represents a contextual view of the first image $I_t$ of the training pair while $O_s$ represents a contextual view of the second image $I_s$. Thus, an image space 810 of the second image $I_s$ is a reprojected area onto which the reprojected distance loss function projects the ground truth depth data and the predicted depth data. As illustrated, one point in a 3D scene shared between the images and represented by $\hat{x}$ and x in the diagram 800 is projected back onto the image space 810. The projected 3D points within the image space 810 are represented as pixels $\hat{p}$ and p. The training module 230 compares the reprojected pixels on the image space 810 according to the reprojected distance loss function to calculate the reprojected distance loss, as shown in EQ (9).

It should be noted that the formulation of the reprojected distance loss function provides for weighting the depth ranges different (i.e., according to proximity to the vanishing point). This weighting is not artificial, but rather is a by-product of camera geometry with errors being proportional to respective reprojections onto the image space. Similarly, weighting according to distance to the vanishing point directly correlates to the baseline used in structure-from-motion determinations, as discussed in relation to the self-supervised loss.

As an additional note and as previously indicated, the reprojected distance loss is not appearance-based. Therefore, in general, any transformation matrix T may be applied to produce the reprojections from which the distance is minimized. However, in one embodiment, the training module 230 enforces the transformation T used in the reprojected distance loss as $T=T_{t\to s}$, which is the transformation 290 produced by the depth model 280. In this way, the training module 230 can back-propagate through the pose model 280 to directly update the pose model 280 in combination with the depth model 260 and remain consistent with the depth model 260. Additionally, enforcing the transformation further provides for operating on the same reprojected distances used by the photometric loss (i.e., self-supervised loss), but in a scale-aware capacity thereby avoiding the inherent ambiguity of the self-supervised loss and forcing the models 260/280 into metrically accurate models. In this way, the reprojected distance loss improves the training of the models 260 and 280 to provide models that are scale aware. The training module 230 imposes the supervised loss to further refine the depth model 260. As noted, the additional supervised loss allows the depth model 260 to learn metrically accurate estimates resulting in the depth model 260 improving predictions.

It should be appreciated that the training module 230 trains the depth model 260 and the pose model 280 together in an iterative manner over the training data 250 that includes a plurality of monocular images from video and a plurality of monocular video images with corresponding depth data, which may be from a LiDAR or other depth sensor. Through the process of training the model 260, the training module 230 adjusts various hyper-parameters in the model 260 to fine-tune the functional blocks included therein. Through this training process, the model 260 develops a learned prior of the monocular images as embodied by the internal parameters of the model 260. In general, the model 260 develops the learned understanding about how depth relates to various aspects of an image according to, for example, size, perspective, and so on.

Consequently, the network module 220 can provide the resulting trained depth model 260 in the depth system 170 to estimate depths from monocular images that do not include an explicit modality identifying the depths. In further aspects, the network module 220 may provide the depth model 260 to other systems that are remote from the depth system 170 once trained to perform similar tasks. In this way, the depth system 170 functions to improve the accuracy of the depth model 260 while using the reprojected distance loss to uniquely characterize errors and update both models according to information that is not appearance-based. Additionally, the reprojected distance loss in combination with sparse depth data further improves the overall training process to better leverage the sparse depth data to train both models using a limited set of supervising information.

Figure 7:
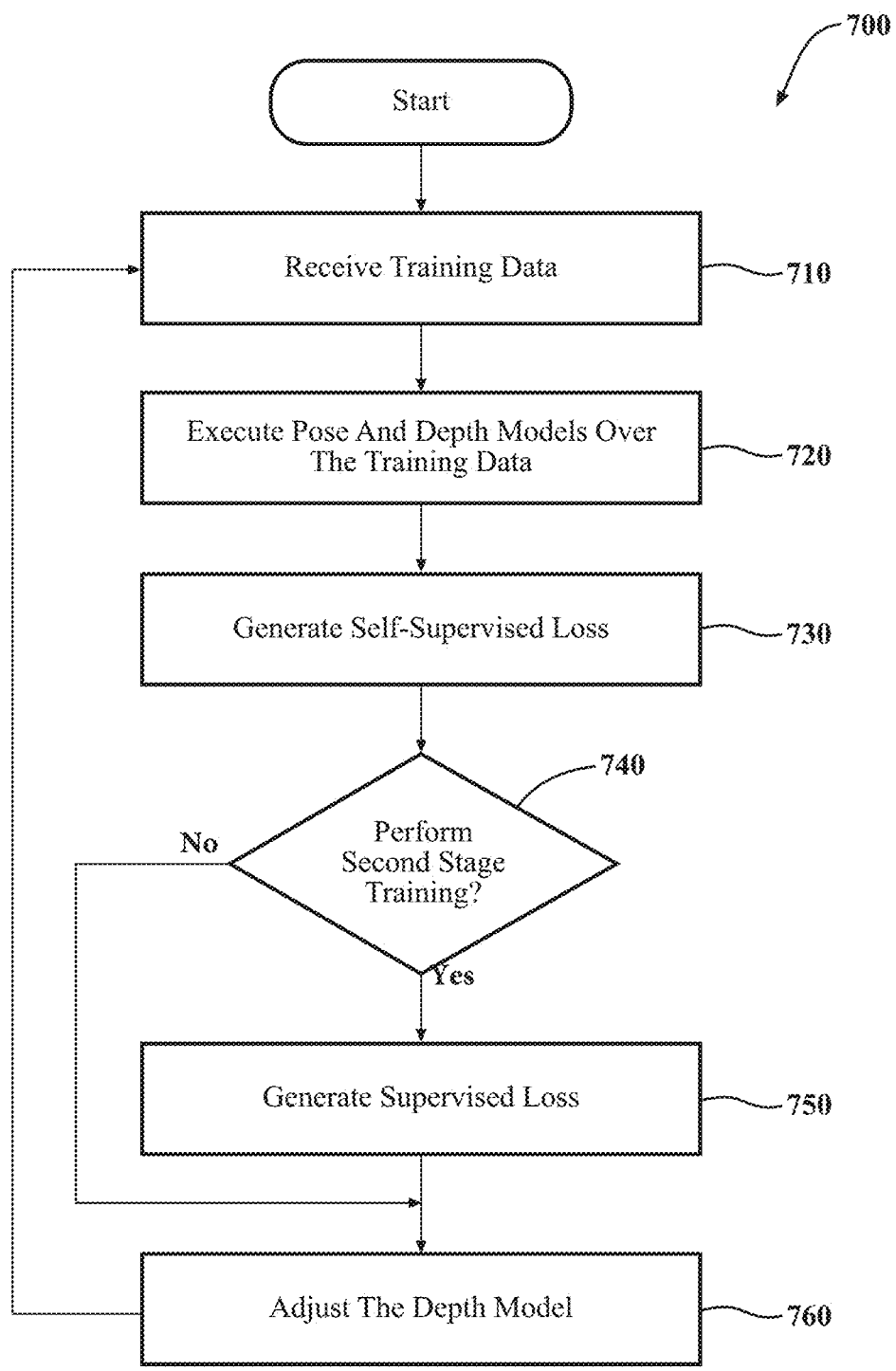
FIG. 7 is a flowchart illustrating one embodiment of a method for training a depth model.

Additional aspects of training a depth model will be discussed in relation to FIG. 7. FIG. 7 illustrates a flowchart of a method 700 that is associated with semi-supervised training of a depth model for monocular depth estimation using a reprojected distance loss function in the supervised stage. Method 700 will be discussed from the perspective of the depth system 170. While method 700 is discussed in combination with the depth system 170, it should be appreciated that the method 700 is not limited to being implemented within the depth system 170 but is instead one example of a system that may implement the method 700.

As an additional note about the general structure of the method 700, training the depth model 260 according to the first stage that is self-supervised is generally represented at blocks 710, 720, 730, and 760. By contrast, the second stage, which is supervised, is generally represented at blocks 710, 720, 730, 740, 750, and 760. Thus, the second stage encompasses the first stage in addition to further aspects corresponding with added blocks 740, and 750. Thus, training according to the separate stages will generally be described according to method 700 overall. Yet, it should be appreciated that training according to the separate stages generally occurs independently and over multiple iterations with the first stage executing over a plurality of iterations prior to training according to the second stage over a plurality of additional iterations occurring after the first stage. In any case, once the depth model 260 is trained overall according to both stages, the depth model 260 provides a metrically accurate mechanism for inferring depths from monocular images, which the network module 220 may then provide to another device or use within the existing device to perceive information about an environment. Moreover, the method 700 focuses on the two-stage semi-supervised training process while method 900 of FIG. 9 focuses individually on the reprojected distance loss, which may be applied in the context of the method 700 or separately.

At 710, the training module 230 receives the training data 250 including a pair of monocular training images, and depth data when training in the second stage. In one embodiment, the training module 230 acquires the training images locally from co-located systems with the depth system 170 (e.g., the camera 126) in an active manner along with the depth data, while in further embodiments, the training module 230 may acquire the training images and depth data through a communication link with a remote system or from a repository of such information as included in the data store 240. Thus, while the depth system 170 can be implemented within a particular device that is, for example, actively navigating an environment, the depth system 170 may also function as a cloud-based computing service to train the depth model 260 and/or to analyze monocular images for depth information, and thus may receive the training data 250 from separate sources.

Furthermore, receiving the training data 250 also includes, in one embodiment, receiving depth data associated with the monocular video in order to facilitate the supervised training stage. That is, whether the depth data is embedded with the monocular training images or is provided separately, the training data 250 includes the depth data for, in one approach, at least a subset of the image from the video. As previously mentioned, the depth data is sparse depth data (e.g., derived from a LiDAR having four scanning beams) that correlates with the video from the camera 126. Thus, the camera 126 and a LiDAR 124 are generally calibrated together in order to correlate the depth data with the images. As previously described, the monocular video from which the training images are derived may have different characteristics according to different implementations but is generally a single monocular video (i.e., from a camera having a single imaging device) that does not include explicit depth information, but may be selectively supplemented with the sparse depth data to facilitate the supervised training stage. Moreover, when functioning in a capacity separate from training, the depth system 170 generally accepts individual monocular images that may or may not be from a video source and that do not include explicit depth data.

At 720, the training module 230 causes the network module 220 to execute the depth model 260 and the pose model 280 on a pair of training images from the training data 250. In one embodiment, the network module 220 executes the depth model 260 to process a first image of a training pair to generate the depth map 270. In general, execution of the depth model 260 to produce the depth map 270 at 720 is a routine execution of the depth model 260. That is, in general, there is no variation in the way in which the model 260 is executed during training since the overall goal is to have the model 260 produce the depth map 270 according to learned weights and as would occur in normal operating conditions so that the training module 230 can subsequently assess the performance of the model 260 according to the loss functions.

Additionally, at 720, the network module 220 executes the pose model 280 to process the first image and a second image of the training pair to generate the transformation 290. The execution of the pose model 280 is generally routine occurs under normal operating conditions. Although the pose model 280 may be used in various circumstances for generating transformations, the depth system 170 generally uses the pose model 280 for the limited application of training the depth model 260. Thus, when implemented as part of the depth system 170, the pose model 280 may reside in an idle state when the system 170 is not training the depth model 260. In any case, the training module 230 induces the network module 220 to execute the models 260/280 in parallel during training to generate the depth map 270 and the transformation 290 to facilitate the overall self-supervised training process. That is, the pose model 280 functions to facilitate the self-supervised structure from motion (SfM) training regime by providing the transformation 290 from which the training module 230 may assess the performance of the depth model 260. Of course, as an additional aspect of using the pose model 280 to generate the transformation 290, the training module 230 also trains the pose model 280 and does so, in one embodiment, in combination with the depth model 260. Moreover, it should be appreciated that executing the depth model 260 and the pose model 280 for the first and the second stage generally occurs in the same manner for both stages. However, in the second stage of training at least the first image further includes the corresponding depth data for subsequent use in generating the second stage loss values as discussed in greater detail subsequently.

At 730, the training module 230 computes the self-supervised loss(es) (e.g., photometric loss, depth smoothness loss, etc.) as either independent losses for the first stage or as one component of a second stage loss. In one embodiment, the training module 230 also computes a pose loss at 730. In any case, in one embodiment, the training module 230 initially calculates the self-supervised loss according to a comparison between a synthetic image and the target image (i.e., the first image of the pair) according to the photometric loss function, which may include an appearance loss, a regularization/depth smoothness loss, and/or other components that are appearance-based.

Thus, the training module 230 uses this appearance-based loss as both the first stage loss to account for pixel-level similarities and irregularities along edge regions between a synthesized image derived from depth predictions of the depth model and a target image that is the original input into the depth model 260. In one approach, the training module 230 synthesizes a target image $\hat{I}_t$ from the depth map 270 and the transformation 290. This synthesized target image $\hat{I}_t$ generally corresponds to the first training image $I_t$ as opposed to the second training image $I_S$ of the pair $I_t$, $I_S$ that is provided into the depth model 260 and to which the depth map 270 $\hat{D}_t$ corresponds. Thus, the training module 230 generates the synthetic target image $\hat{I}_t$ as a regenerated view of the same scene depicted by the depth map 270 and the first training image $I_t$. In one embodiment, the training module 230 generates the synthetic image according to a warping operation that functions to adapt a viewpoint of the camera in order to recover the original first image as the synthesized image. In various approaches, the training module 230 may implement different algorithms to perform the warping, which may include a convolutional neural network (CNN) or other machine learning architecture.

At 740, the training module 230 determines whether the current training stage is the first or second and jumps to adjusting the depth model 260 if at the first stage or generating the additional second-stage supervised loss if at the second stage. In one embodiment, as previously noted, the first stage of training is a self-supervised structure from motion (SfM) training process that accounts for motion of a camera between the training images of a pair to cause the depth model to learn how to infer depths without using annotated training data (i.e., without the depth data). However, because the resulting depth model 260 from solely training on the self-supervised process does not accurately understand scale (i.e., is scale ambiguous), the training module 230 further imposes the second stage to refine the depth model 260. That is, The training module 230 trains the depth model according to the second stage to refine the depth model 260 using second training data that includes the annotations about depth in the individual images. As previously noted, the sparse depth data includes selective dispersed ground truths providing limited supervision over depth estimates of the individual images.

At 750, the training module 230 generates the second stage loss values using a second stage loss function. In one embodiment, the training module 230 generates the second-stage loss using the second stage loss function (e.g., one of equations (6), (7), or (9)), which is a supervised loss function that generally functions to compare values between the depth map 270 and corresponding depth data. This comparison provides a non-appearance based assessment of how well the depth model 260 is producing the depth map 270 in relation to ground truth data, which includes known depth values for points corresponding to the first image. Thus, refining the depth model 260 using the ground truth data as a point of comparison causes the depth model 260 to learn metrically accurate scale for depths. As previously noted, the depth data itself may take different forms such as LiDAR, radar, etc. but serves as a mechanism for directly supervising the depth model 260 using sparse data points as opposed to a comprehensive annotated data to further refine the model 260.

At 760, the training module 230 updates the depth model 260 according to the loss values (e.g., first stage or first/second stage) as determined by the training module 230. In one embodiment, the training module 230 updates the depth model 260 using the loss values to adapt weights in the model 260. Therefore, the disclosed two-stage semi-supervised training approach implemented by the depth system 170 improves the understanding of the depth model 260 while using primarily self-supervised training that is supplemented with the additional refinement stage that uses a minimal set of sparsely annotated depth data. In this way, the depth system 170 improves the depth model 260 to produce improved depth estimates that translate into improved situational awareness of the implementing device (e.g., the vehicle 100), and improved abilities to navigate and perform other functions therefrom.

It should be appreciated that the network module 220 can further leverage the depth model 260 once trained to analyze monocular images from the camera 126 and provide the depth map 270 to additional systems/modules in the vehicle 100 in order to control the operation of the modules and/or the vehicle 100 overall. In still further aspects, the network module 220 communicates the depth map 270 to a remote system (e.g., cloud-based system) as, for example, a mechanism for mapping the surrounding environment or for other purposes (e.g., traffic reporting, etc.). As one example, the network module 220, in one approach, uses the depth map 270 to map locations of obstacles in the surrounding environment and plan a trajectory that safely navigates the obstacles. Thus, the network module 220 may, in one embodiment, control the vehicle 100 to navigate through the surrounding environment.

In further aspects, the network module 220 conveys the depth map 270 to further internal systems/components of the vehicle 100, such as the autonomous driving module 160. By way of example, in one arrangement, the network module 220 generates the depth map 270 using the trained depth model 260 and conveys the depth map 270 to the autonomous driving module 160 in a particular scale that the module 160 accepts as an electronic input. In this way, the depth system 170 informs the autonomous driving module 160 of the depth estimates to improve situational awareness and planning of the module 160. It should be appreciated that the autonomous driving module 160 is indicated as one example, and, in further arrangements, the network module 220 may provide the depth map 270 to the module 160 and/or other components in parallel or as a separate conveyance.

Figure 9:
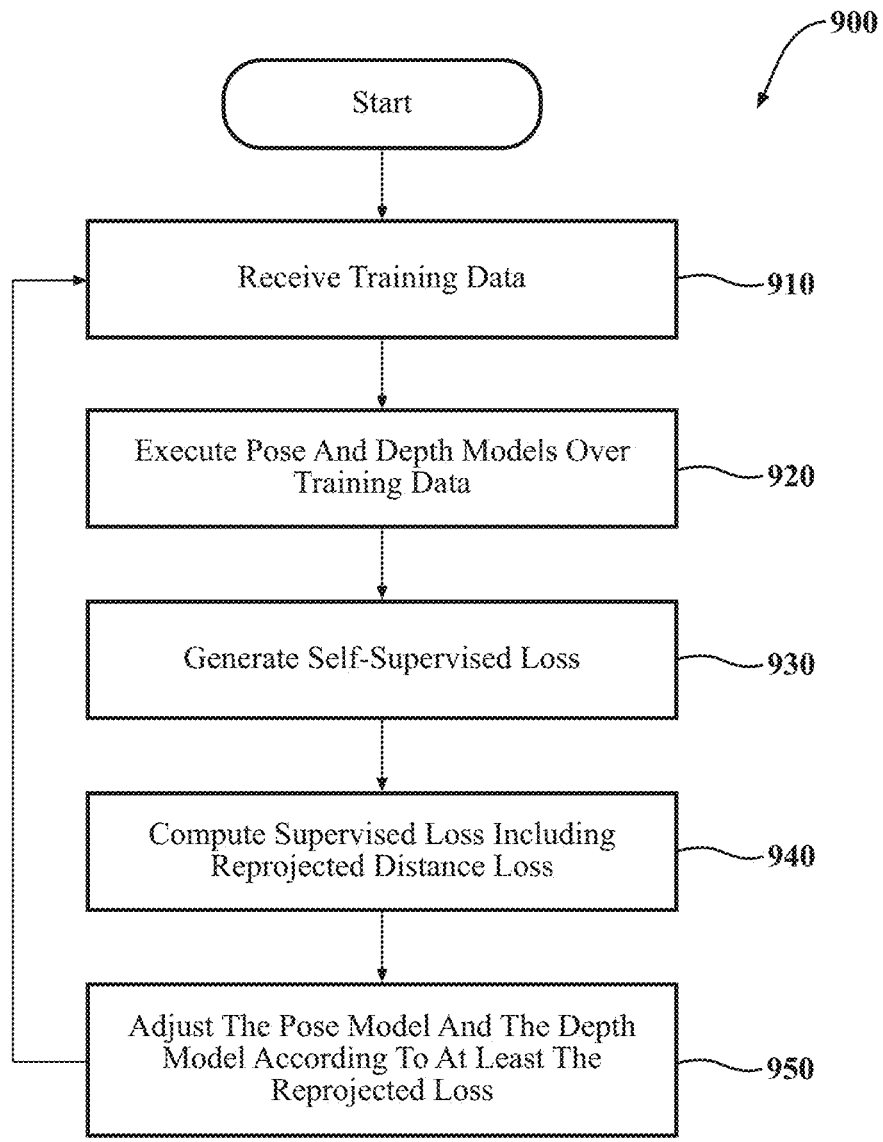
FIG. 9 is a flowchart illustrating an embodiment of a method associated with generating a reprojected distance loss to train a depth model.

As additional explanation of the reprojected distance loss, consider FIG. 9. FIG. 9 illustrates a flowchart of a method 900 that is associated with supervised training (either independently or as a stage of a two-stage training process) of a depth model for monocular depth estimation. Method 900 will be discussed from the perspective of the depth system 170. While method 900 is discussed in combination with the depth system 170, it should be appreciated that the method 900 is not limited to being implemented within the depth system 170 but is instead one example of a system that may implement the method 900.

At 910, the training module 230 receives the training data 250. In one embodiment, the training data 250 includes a pair of training images, and depth data for each separate iteration of the method 900. As previously indicated in relation to method 700, the training module 230 may acquire the training images locally from co-located systems with the depth system 170 (e.g., the camera 126), or, in further embodiments, the training module 230 may acquire the training images and depth data from a repository of such information as included in the data store 240 or otherwise. Thus, while the depth system 170 can be implemented within a particular device that is, for example, actively navigating an environment and acquiring the training data 250, the depth system 170 may also function as a cloud-based computing service to train the models 260/280 and/or to analyze monocular images for depth information, and thus may receive the training data 250 from separate sources.

Furthermore, the depth data associated with training the method 900 provides for supervised training of the depth model 260 and the pose model 280. Thus, the depth data may be embedded with the training images or may be provided separately. Additionally, according to the particular approach, the depth data may be comprehensive for the image or may be sparse depth data. That is, for example, depending on available depth data, the depth system 170 may selectively use either sparse data or other forms of depth data (e.g., more dense depth data). However, it should be appreciated that the depth system 170 is capable of executing the methods 700 and 900 using only sparse depth data in order to appreciate the noted benefits of using depth data in this form.

At 920, the network module 220, at the direction of the training module 230, executes the pose model 280 and the depth model 260. In one embodiment, the network module 220 uses the depth model 260 to generate a depth map 270 from a first image of a pair of training images, and uses the pose model 280 to generate the transformation 290 from the first image and a second image of the pair. Of course, the depth model 270 indicates depths within the scene. Additionally, the transformation 290 indicates a difference in a frame of reference between the images according to ego-motion (i.e., motion of the camera) and defines a relationship between the pair of training images.

At 930, the training module 230 generates the self-supervised loss. In one embodiment, the training module 230 generates the self-supervised loss by generating at least a photometric loss according to EQ (2). For example, the training module 230 synthesizes an image from the depth map 270 and the transformation 290. The training module 230 then compares the synthesized image with one of the original training images to determine a similarity/disimilarity therebetween that is indicative of the photometric loss. In further aspects, the training module 230 may calculate further components to adapt the determination of the photometric loss such as the binary mask discussed previously. Moreover, the training module 230 may further generate additional loss terms as part of the self-supervised loss such as the depth smoothness noted in EQ (5).

At 940, the training module 230 computes the supervised loss. In one embodiment, the training module 230 computing the supervised loss as the reprojected distance loss by projecting the depth map 270, or at least portions of the depth map 270, and corresponding information from the depth data onto an image space of the second image. For example, the training module uses the depth map 270 as a source for information about the scene and effectively attempts to reconstruct the second image using the information (i.e., points in 3D space of the scene) and the transformation 290 to relate (i.e., project) the information onto the image space of the second image. Thus, the training module 230 projects the predicted information in the depth map 270 as predicted pixels of the image, and projects ground truth information (i.e., depth data) as ground truth pixels onto the image space. As noted, the image space corresponds to a contextual view of a camera about the scene when capturing the second image (e.g., $I_s$).

The training module 230 can then compare corresponding ground truth and predicted pixels in the image space to determine the reprojected distance loss, as shown in EQ (9). In this way, the training module 230 can integrate losses from the depth model 260 and the pose model 280 into a single term that is not appearance-based in order to provide a combined mechanism for updating the models 260/280. It should be noted that the depth map 270 and the depth data may not have an equal number of corresponding points. That is, especially in the case of using sparse depth data, the depth data may include just 77 points, whereas the depth map 270 may include many more (e.g., thousands). Thus, the reprojected distance loss function, as implemented by the training module 230, generally computes the reprojected distance loss according to points between the ground truth pixels and the predicted pixels that correlate. Accordingly, depending on the extent of the depth data, the number of points of comparison may vary for a given calculation of the reprojected distance loss.

At 950, the training module 230 updates the depth model 260 and the pose model 280. In one embodiment, the training module 230 uses at least the reprojected distance loss to update the pose model 280 while using the reprojected distance loss and at least the self-supervised loss to update the depth model 260, which may occur according to assigned weights for the separate terms.

In one embodiment, the training module 230 uses the values for the loss terms to update weights/hyper-parameters in the models 260/280. Therefore, the disclosed training approach improves the understanding of the models 260/280 while using the noted loss terms. In this way, the depth system 170 improves the depth model 260 and the pose model 280 to produce improved depth estimates/transformations that may ultimately translate into improved situational awareness of the implementing device (e.g., the vehicle 100), and improved abilities to navigate and perform other functions therefrom.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and /or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110 , and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system for training a depth model for monocular depth estimation, comprising:
   one or more processors;
   a memory communicably coupled to the one or more processors and storing:
      a network module including instructions that when executed by the one or more processors cause the one or more processors to:
      generate, as part of training the depth model according to a supervised training stage, a depth map from a first image of a pair of training images using the depth model, wherein the pair of training images are separate frames depicting a scene from a monocular video, and wherein at least the first image includes corresponding depth data,
      generate a transformation from the first image and a second image of the pair using a pose model, the transformation defining a relationship between the pair of training images; and
      a training module including instructions that when executed by the one or more processors cause the one or more processors to compute a supervised loss based, at least in part, on reprojecting predicted pixels of the depth map and ground-truth depth of the depth data into a 3D space that is a reprojected area associated with the second image according to a project function using the transformation, wherein computing the supervised loss includes comparing the predicted pixels and the ground-truth depth within the reprojected area by reconstructing 3D points of the scene corresponding to a contextual view of the second image, and
      update the depth model and the pose model together according to at least the supervised loss.

2. The depth system of claim 1, wherein the training module includes instructions to compute the supervised loss including instructions to compute the supervised loss in combination with a self-supervised loss for the supervised training stage that is a second stage of training in a semi-supervised training process, and
   wherein a first stage of training is self-supervised and occurs prior to the second stage.

3. The depth system of claim 2, wherein the first stage is a self-supervised structure from motion (SfM) training process that accounts for motion of a camera between the training images to cause the depth model to learn how to infer depths without annotated training data, and
   wherein the training module includes instructions to compute the supervised loss during the second stage including instructions to compute the supervised loss to refine the depth model using the depth data as selective dispersed ground truths providing limited supervision over depth estimates of the depth model.

4. The depth system of claim 2, wherein the training module includes instructions to, during the first stage, produce first stage loss values from a first stage loss function that includes a photometric loss function and a depth smoothness loss function that separately account for pixel-level similarities and irregularities along edge regions between a synthesized image derived from depth predictions of the depth model and a target image of a respective one of the pairs.

5. The depth system of claim 1,
wherein the predicted pixels correspond with points in the scene as identified in the depth map and observed from the contextual view,
wherein the ground truth depth correspond with the depth data for the first image, and
wherein the training module includes instructions to compute the supervised loss including instructions to use a reprojected distance loss function to compare corresponding ones of the predicted pixels with the ground truth depth to generate a reprojected distance loss.

6. The depth system of claim 1, wherein the depth data includes sparse LiDAR data comprising depth information from four beams that correspond with sparse locations in the training images, and
wherein training module includes instructions to perform a second stage to refine learned weights of the depth model and the pose model using the depth data to train the depth model on scale by accounting for scale aware differences between the depth maps and the sparse LiDAR data to improve scale awareness of the depth model in producing depth estimates.

7. The depth system of claim 1, wherein the network module includes instructions to provide the depth model to infer distances from monocular images in a device,
wherein the training module includes instructions to generate a photometric loss by generating a synthesized version of the first image using the depth map and the transformation, and calculate the photometric loss according to a comparison of the synthesized version with the first image.

8. The depth system of claim 1, wherein the depth model is a machine learning algorithm comprised of an encoder and a decoder that function together to generate depth estimates of a scene from a monocular image, and
wherein the pose model is a machine learning algorithm that performs a dimensional reduction of the training images to derive the transformation describing a change in pose between images within respective ones of the pairs.

9. A non-transitory computer-readable medium for training a depth model for monocular depth estimation and including instructions that when executed by one or more processors cause the one or more processors to:
generate a depth map from a first image of a pair of training images using the depth model, wherein the pair of training images are separate frames depicting a scene from a monocular video, and wherein at least the first image includes corresponding depth data;
generate a transformation from the first image and a second image of the pair using a pose model, the transformation defining a relationship between the pair of training images;
compute a supervised loss based, at least in part, on reprojecting predicted pixels of the depth map and ground-truth depth of the depth data into a 3D space that is a reprojected area associated with the second image according to a project function using the transformation, wherein computing the supervised loss includes comparing the predicted pixels and the ground-truth depth within the reprojected area by reconstructing 3D points of the scene corresponding to a contextual view of the second image; and
update the depth model and the pose model together according to at least the supervised loss.

10. The non-transitory computer-readable medium of claim 9, wherein the instructions to compute the supervised loss include instructions to compute the supervised loss in combination with a self-supervised loss for a supervised training stage that is a second stage of training in a semi-supervised training process, and
wherein a first stage of training is self-supervised and occurs prior to the second stage.

11. The non-transitory computer-readable medium of claim 9, wherein the ground truth depth corresponds with the depth data for the first image.

12. The non-transitory computer-readable medium of claim 9,
wherein the instructions to compute the supervised loss include instructions to use a reprojected distance loss function to compare corresponding ones of the predicted pixels with the ground truth depth to generate a reprojected distance loss.

13. A method of training a depth model for monocular depth estimation, comprising:
generating, as part of training the depth model according to a supervised training stage, a depth map from a first image of a pair of training images using the depth model, wherein the pair of training images are separate frames depicting a scene from a monocular video, and wherein at least the first image includes corresponding depth data;
generating a transformation from the first image and a second image of the pair using a pose model, the transformation defining a relationship between the pair of training images;
computing a supervised loss based, at least in part, on reprojecting predicted pixels of the depth map and ground-truth depth of the depth data into a 3D space that is a reprojected area associated with the second image according to a project function using the transformation, wherein computing the supervised loss includes comparing the predicted pixels and the ground-truth depth within the reprojected area by reconstructing 3D points of the scene corresponding to a contextual view of the second image; and
updating the depth model and the pose model together according to at least the supervised loss.

14. The method of claim 13, wherein computing the supervised loss includes computing the supervised loss in combination with a self-supervised loss as the supervised training stage that is a second stage of training in a semi-supervised training process, and wherein a first stage of training is self-supervised and occurs prior to the second stage.

15. The method of claim 14, wherein the first stage is a self-supervised structure from motion (SfM) training process that accounts for motion of a camera between the training images to cause the depth model to learn how to infer depths without annotated training data, and
wherein computing the supervised loss during the second stage includes computing the supervised loss to refine the depth model using the depth data as selective dispersed ground truths providing limited supervision over depth estimates of the depth model.

16. The method of claim 14, wherein the first stage includes producing first stage loss values from a first stage loss function that includes a photometric loss function and a depth smoothness loss function that separately account for pixel-level similarities and irregularities along edge regions between a synthesized image derived from depth predictions of the depth model and a target image of a respective one of the pairs.

17. The method of claim 13,
wherein the predicted pixels correspond with points in the scene as identified in the depth map and observed from the contextual view,
wherein the ground truth depth correspond with the depth data for the first image, and
wherein computing the supervised loss includes using a reprojected distance loss function to compare corresponding ones of the predicted pixels with the ground truth depth to generate a reprojected distance loss.

18. The method of claim 13, wherein the depth data includes sparse LiDAR data comprising depth information from four beams that correspond with sparse locations in the training images, and
wherein the second stage refines learned weights of the depth model and the pose model using the depth data to train the depth model on scale by accounting for scale aware differences between the depth maps and the sparse LiDAR data to improve scale awareness of the depth model in producing depth estimates.

19. The method of claim 13, wherein the depth model is a machine learning algorithm comprised of an encoder and a decoder that function together to generate depth estimates of a scene from a monocular image, and
wherein the pose model is a machine learning algorithm that performs a dimensional reduction of the training images to derive the transformation describing a change in pose between images within respective ones of the pairs.

20. The method of claim 13, further comprising:
providing the depth model to infer distances from monocular images in a device,
wherein computing the supervised loss further includes generating a photometric loss by generating a synthesized version of the first image using the depth map and the transformation, and calculating the photometric loss according to a comparison of the synthesized version with the first image.

* * * * *